United States Patent [19]

Hiraoka et al.

[11] Patent Number: 4,935,830
[45] Date of Patent: Jun. 19, 1990

[54] ELECTRO-MAGNETIC SHIELD STRUCTURE FOR SHIELDING A SERVO MAGNETIC HEAD OF A MAGNETIC DISK STORAGE DEVICE

[75] Inventors: Sinzi Hiraoka; Kazuo Matsuda, both of Kawasaki; Takeshi Ohyama, Nagano, all of Japan

[73] Assignee: Fujitsu Limited, Kawasaki, Japan

[21] Appl. No.: 168,391

[22] Filed: Mar. 15, 1988

[30] Foreign Application Priority Data

Mar. 18, 1987 [JP] Japan ................................ 62-061094
Jul. 28, 1987 [JP] Japan ................................ 62-116447

[51] Int. Cl.$^5$ ........................ G11B 5/115; G11B 5/55; G11B 17/02
[52] U.S. Cl. .............. 360/128; 360/98.01; 360/106
[58] Field of Search ...................... 360/128, 106, 98.01

[56] References Cited

U.S. PATENT DOCUMENTS

| | | | |
|---|---|---|---|
| 4,346,416 | 8/1982 | Riggle et al. | 360/106 |
| 4,402,025 | 8/1983 | Anderson et al. | 360/128 |
| 4,571,649 | 2/1986 | Goss | 360/106 |

FOREIGN PATENT DOCUMENTS 58-17515 2/1983 Japan.
60-136024 7/1985 Japan.
60-140524 7/1985 Japan.

OTHER PUBLICATIONS

Dickie et al., Magnetic Shield Assembly, IBM Tech. Disc. Bull., vol. 19, No. 4, Sep., 1976, p. 1439.
Elliott et al., Magnetic Shield for Disk File, IBM Tech. Disc. Bull., vol. 19, No. 4, Sep., 1976, p. 1437.

*Primary Examiner*—Robert S. Tupper
*Attorney, Agent, or Firm*—Staas & Halsey

[57] ABSTRACT

A magnetic disk storage device having a magnetic shield for shielding a magnetic servo-head from noise generated by an adjacent data-head during a write operation when both magnetic heads are arranged back-to-back in a space between two magnetic disks stacked co-axially. The shield plate is secured to an inner surface of a base portion of a housing of the device, thus avoiding an increase in the weight and moment of inertia of moving members of a head positioner.

19 Claims, 7 Drawing Sheets

ELECTRO-MAGNETIC SHIELD STRUCTURE FOR SHIELDING A SERVO MAGNETIC HEAD OF A MAGNETIC DISK STORAGE DEVICE

BACKGROUND OF THE INVENTION

The present invention relates to a magnetic disk storage device, wherein a magnetic servo-head and a magnetic data-head are disposed in a back to back relationship within a space between two magnetic disks. In particular, it relates to a magnetic shield means for shielding a magnetic servo-head from noise generated by an adjacent magnetic data-head during a write operation.

Magnetic disk storage devices are widely used as a non-volatile storage means because of their compact size and high storage capacity. At present, the storage capacity 5¼ inch storage devices is, for instance, 400 mega bytes. In such a device, a plurality of magnetic disks (hereinafter "disks") are stacked in parallel and co-axially on a rotatable spindle, and spaced apart from each other by a predetermined distance so as to form a block or a disk assembly. The spindle is rotated by a driving motor at a high speed such as 3600 rpm.

A magnetic disk comprises a layer of a substrate made of, for example, aluminum. Both sides of the substrate are coated with a magnetic medium, such as $\gamma$-ferric oxide ($\gamma Fe_2O_3$) particles. Information is stored in the magnetic layer in the form of data bits sequentially arranged in concentric circles referred to as a tracks. The data bits are created in the magnetic medium of a track by a magnetic data-head (hereinafter "data-head"). The data-head is actuated in response to data signals supplied from a central controller of the storage device. This is refereed to as a write operation, and the region on the surface of the disk where the data bits are formed is referred to as a data region. The data bits are accessed and read by the data head during a read operation period. Servo information, including address signals and servo signals, are stored in the form of servo bits in a servo region which usually occupies a part of the surface of a disk. The servo bits are read by a magnetic servo-head (hereinafter "servo-head").

Usually, a magnetic disk storage device has a plurality of data-heads and only one servo-head. Generally, each of these comprises an electromagnetic transducer and an air slider. The transducer and air slider are flexibly suspended from a suspending member which includes a gimbal spring and a spring arm. The suspending member is secured to a rigid supporting member at an end of the suspending member opposite the end where the transducer is mounted. The suspending member keeps the transducer at a predetermined flying height, such as 0.2 $\mu$m, over the surface of a rotating disk by balancing the weight of the transducer, air slider, suspending member and rigid supporting member against the aerodynamic lift produced by the air slider. New data is written to and read from the data region via the transducer and a magnetic field in the gap between the transducer and the disk.

The supporting members are stacked tightly around a spindle. The stacked arrangement of supporting members is referred to as a head block. The spindle is supported by a supporting means, such as ball bearings, so as to be rotatable around an axis of the spindle and to be driven by a voice coil motor (VCM) attached to the head block. The VCM is controlled by access signals typically provided by a central computer. The head block is rotated clockwise or counter-clockwise so that the data-heads move along an arc. The data-heads therefore move approximately perpendicular to each track. To access the disk storage device, track address signals and track error signals are read by the servo-head and fed back to an access control circuit which forms a closed loop feed back control system. Movement of the data-heads when accessing a track is performed under the control of access signals.

The above-described access mechanism for moving data-heads to a specified track is well-known and referred to as a swinging head positioner. There is also a head positioner of another type which is movable along a straight line running in a radial direction of the disk. This is referred to as a linear head positioner, and uses a carriage on which the head block is mounted. With this mechanism heads can traverse the tracks exactly perpendicularly.

The need for high speed read/write operations, high recording densities and high reliability, results in a high degree of configurational precision and results in a number of problems to be solved. One of the problems is erroneous operation of the servo-system of the disk device during a write operation of a nearby data-head. This error is induced by electro-magnetic noise caused because the data-head transducer. The transducer used in the data and servo heads includes a small coil. During a write operation of a data-head, data signals (e.g., a series of pulse trains) are sent from the central computer and applied to the coil. This is called actuating the data-head to produce data bits on the relevant track. But, the pulse signals induce magnetic leakage flux to emanate from the coil. The frequency of the noise ranges from a low of, e.g., 1.5 MHZ, to a high of, e.g., 2 MHZ. If a servo-head is located near the data-head, the servo-head detects the leakage flux; thus, causing noise in the servo-head. The induced noise adversely affects the servo-operation of the disk storage device. Despite the noise problems, positioning a data-head and a servo-head in the above-described manner is common.

Generally, in recent disk storage devices each side of the disk is used as a storage medium. Thus, two magnetic heads are placed in the space between adjacent stacked disks, each head facing a respective disk surface. The heads are inserted in these spaces via a head positioner mechanism.

It is desirable to place the servo-head in a centrally located one of the spaces between the stacked disks of a disk assembly. The reason for is as follows. The actual axis of rotation of a disk assembly tends to be subject to a slight inclination off the ideal position due to unavoidable tolerances in the relevant supporting structure for supporting and rotating the spindle. If the servo-head is placed in a centrally located space, the off-track positioning error of the data-heads located near the end portions of the stacked disk assembly is minimized. This is because the disk assembly is positioned with no off-track error at the center portion of the disk assembly since the servo-head is centrally positioned. In such a configuration, a servo-head is always placed near a data-head, and is therefore subject to noise from the data-head. Because of the noise, this configuration is not desirable.

An existing noise reduction scheme is described below. A magnetic disk assembly having a servo-head that is surrounded by an electromagnetic shield cap. Unexamined Japanese Patent Application, Ser. No.

60-136024, published on July 19, 1985, by Matsumoto discloses a magnetic disk assembly having a servo-head that is surrounding by an electromagnetic shield cap. This arrangement attaches the shield cap to the associated supporting arm as described below.

FIG. 1 is a schematic side view illustrating the arrangement of disks 2 to 5 stacked co-axially around a rotatable spindle 1. As shown in FIG. 1, magnetic heads 6 to 13 are respectively mounted on the tips of suspending members 14 to 21. Gimbal springs and spring arms are fixed to supporting arms 22 to 26. As seen from the figure, the heads are arranged on the same cylinder; namely, a cylindrical plane that is co-axial with the spindle 1. Although it is not shown in FIG. 1, the stacked supporting arms 22 to 26 comprise a head assembly of a swinging head positioner. The head 10 is a servo-head and the other heads are data-heads. Each surface of the disks 2 to 5 is used as a data region, except for a part of an upper surface 4a of the disk 4. The region 4a is used to store servo information. The heads face the disk surfaces, and are at a predetermined flying height above the surfaces when the disk assembly is rotated at operational speeds. As shown in FIG. 1, the servo-head 10 and the data-head 9 are arranged in a back-to-back configuration within the same cylinder. Due to the close proximity of the heads 9 and 10, the servo-head 10 is subject to the noise generated by the data-head 9 during a write operation.

In order to reduce the undesirable effect of the noise, a shield cap 27 of magnetic material is disposed on a tip portion 24a extended from the supporting arm 24. FIG. 2 is a perspective view of the shield cap 27 which comprises a top wall 27a and a U-shaped side wall 27b, defining a space for housing the servo-head 10. Thus, the servo-head 10 is electro-magnetically shielded from noise generated by the data-head 9 during write operations. However, adding the shield cap 27 and the extended portion 24a to the supporting arm 24, undesirably increases weight and the moment of inertia, about the axis of the spindle 1, of the head assembly. This results in various serious disadvantages such as increased access time and erroneous head positioning. In addition, an undesirable mechanical resonance of the servo-head 24 tends to occur during access operations.

Another shielding means is disclosed in unexamined Japanese Patent Application, Ser. No. 60-140524, published on July 25, 1985, by Seki. This application discloses a shield plate fixed to a supporting arm and extending in a plane in which the supporting arm lies. The shield plate is interposed between a data-head and a servo-head, both of which are fixed to the supporting arm parallel to each other and extend in the longitudinal direction of the supporting arm. By this configuration, the servo-head is shielded from noise generated by the data-head. However, the increase in the weight of movable members of the head assembly causes a disadvantages similar to that of the device proposed by Matsumoto.

In order to overcome such problems unexamined Japanese Patent Application, Ser. No. 58-17515, published on Feb. 1, 1983, by Sengoku discloses a shield plate that is secured to a base portion of the relevant housing of the device, and not to a moving member. In this case, a servo-head is disposed to face the bottom surface of the bottom disk, which is the case with a magnetic disk device of rather low storage density. During normal operation, the servo-head is shielded from the noise generated by the other data-heads, that do not require a shield means. This is because the substrate of the disks is usually made of aluminum which has a high electrical conductivity and serves to shield the servo-head from noise, particularly high frequency noise. However, when a head, positioned facing the disk surface opposite the surface faced by the servo-head, accesses tracks near the peripheral edge of the disk, noise generated by the data-head leaks around the edge of the disk and adversely affects the servo-head. As stated above, shield plate of Sengoku is secured to a base portion of the relevant housing that accommodates the relevant disk assembly and head positioner. The shield has a horizontal shield wall disposed in the same plane as the bottom disk that is faced by the servo-head. The shield wall has concaved arc shaped edge that is positioned close to the disk edge, leaving a small gap between the shield edge and the disk edge. The shield plate is made of a magnetic material or electrically conductive material. Thus, magnetic leakage flux from the data-head facing the upper surface of the bottom disk is cut by the shield plate, reducing the undesirable disturbance of the servo-head. With this configuration there is no increase in either the weight or the moment of inertia of the head positioner. However, the use of such a shield plate is limited to the situation where only a servo-head in the space formed between two opposing disks. This is one disadvantage of the shield plate proposed by Sengoku.

For a long period, an improved shield means for shielding a servo-head that overcomes the above disadvantages has been sought in the art.

SUMMARY OF THE INVENTION

It is an object of the present invention to provide a magnetic disk storage device having a swinging magnetic head positioner with an improved electro-magnetic shielding structure for shielding a servo-head from noise produced by an adjacent data-head.

It is another object of the present invention to provide a shielding structure for a servo-head secured to a base member of the device, resulting in no increase in either the weight or the moment of inertia of the associated moving member.

Still another object of the present invention is to provide a simple and compact shielding structure combined with a magnetic head suspension structure.

To achieve the above and other objects, the present invention provides a shield plate which is interposed between a servo-head and an adjacent data-head, and is secured to a base portion of a housing of the device. It is desirable to align the longitudinal axis of a servo-head suspension member with a line connected between the center of the servo-head and the center of a head block assembly. In other words, the suspension member is desirably configured as a 'straight type.'

These and other advantages and novel features of the present invention will be apparent from the following detailed description of the invention taken in conjunction with the accompanying drawings wherein like reference numerals denote like parts.

DESCRIPTION OF THE PREFERRED EMBODIMENTS

Figure 1:
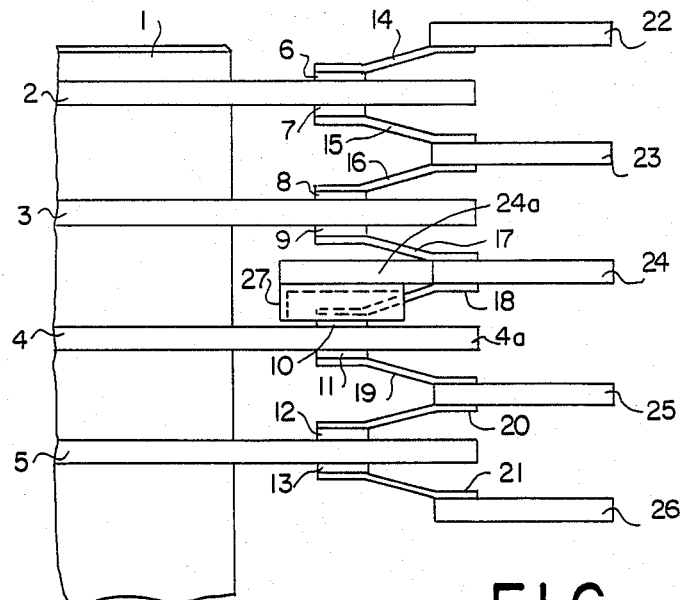
FIG. 1 is a schematic side view of a prior art magnetic disk assembly.
Figure 2:
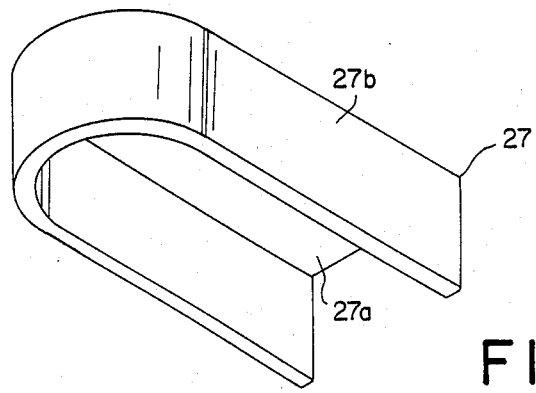
FIG. 2 is a perspective view of a prior art magnetic disk assembly illustrating a shield cap for a servo-head.
Figure 3:
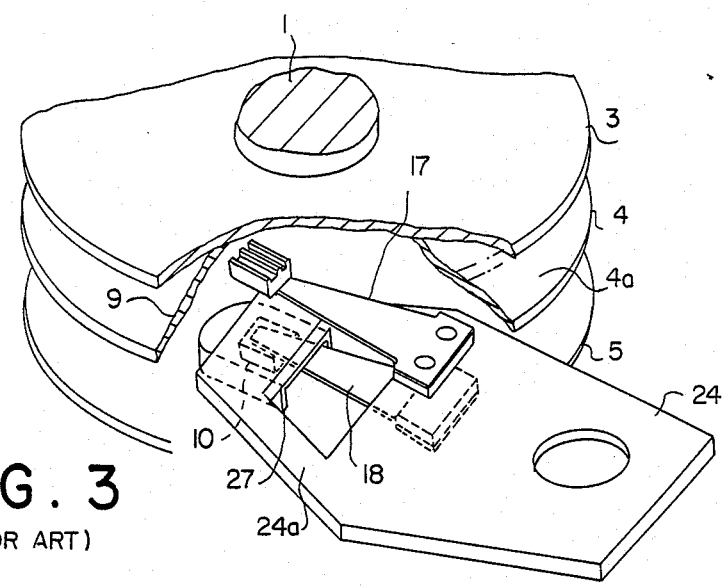
FIG. 3 is a schematic perspective view of a prior art magnetic disk assembly illustrating the shield cap shown in FIG. 2.
Figure 4:
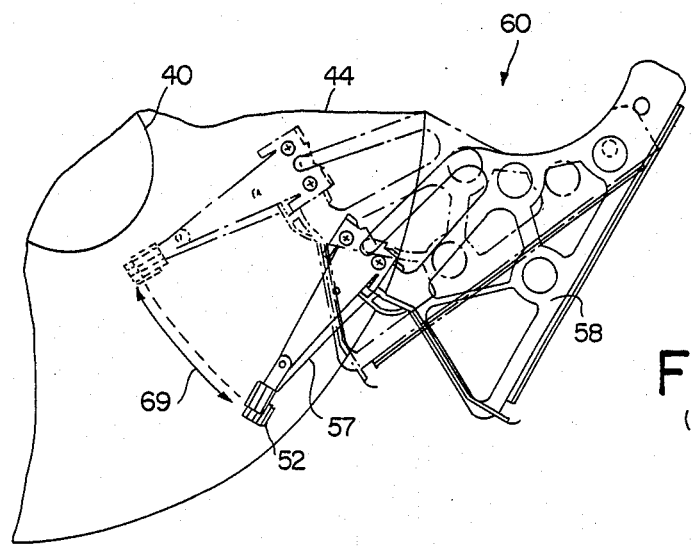
FIG. 4 is a plan view of a supporting member of a straight type magnetic head configuration.
Figure 5:
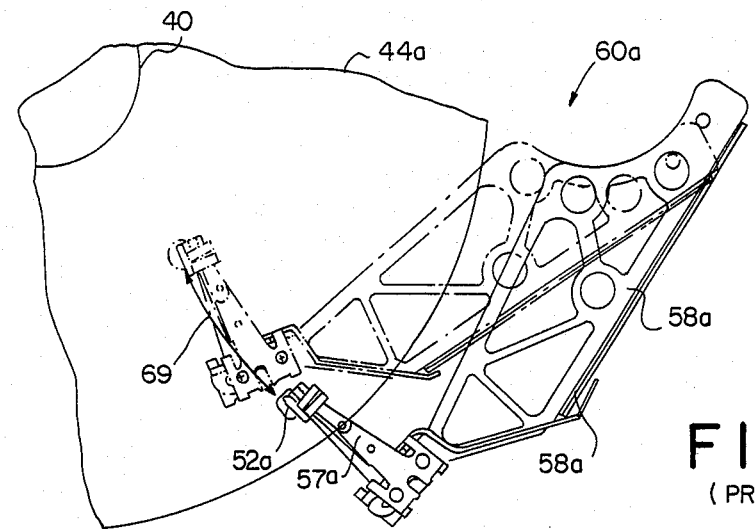
FIG. 5 is a plan view of a supporting member of a dog-leg type magnetic head configuration.

Before discussing the preferred embodiments, two magnetic head supporting member structures will be reviewed. The structures, shown in FIGS. 4 and 5, are well known and described in, for example, U.S. Pat. No. 4,620,251, issued on Oct. 28, 1986, to Gitzendanner. FIG. 4 illustrates a supporting structure for a magnetic head 52. The structure comprises a suspension member 57 including a gimbal spring (hereinafter "gimbal") and a spring arm, and a supporting arm 58 (hereinafter "arm") rotatable around an axis 60 which is represented by a point in FIG. 4. The magnetic head 52 is movable along an arc 69 having as its center the axis 60.

FIG. 5 illustrates a modification of the FIG. 4 structure. In FIG. 5 elements similar to those of FIG. 4 are identified with a suffix 'a'. The difference between these supporting member structures is the direction of the longitudinal axis of the suspending members 57 and 57a. The longitudinal axis of the suspension member 57 is approximately aligned along a radius of the arc 69; that is, along a line running from the axis of rotation 60 to the center of the head 52. The longitudinal axis of the suspension member 57a is approximately aligned along a tangent to the arc 69; that is, along a line in the radial direction of the disk 44a. The FIG. 4 structure is referred to as a 'straight type' and the FIG. 5 structure is referred to as a 'dog-leg type.' The complicated shape of the arms 58 and 58a will be explained later. The following discusses three embodiments of the present invention from the first to a modified version of the first embodiment. Each of the embodiments employs a different suspension member for suspending a magnetic head. The structure or shape of the shield plate of the present invention varies depending on the respective type of the suspension member.

Figure 6:
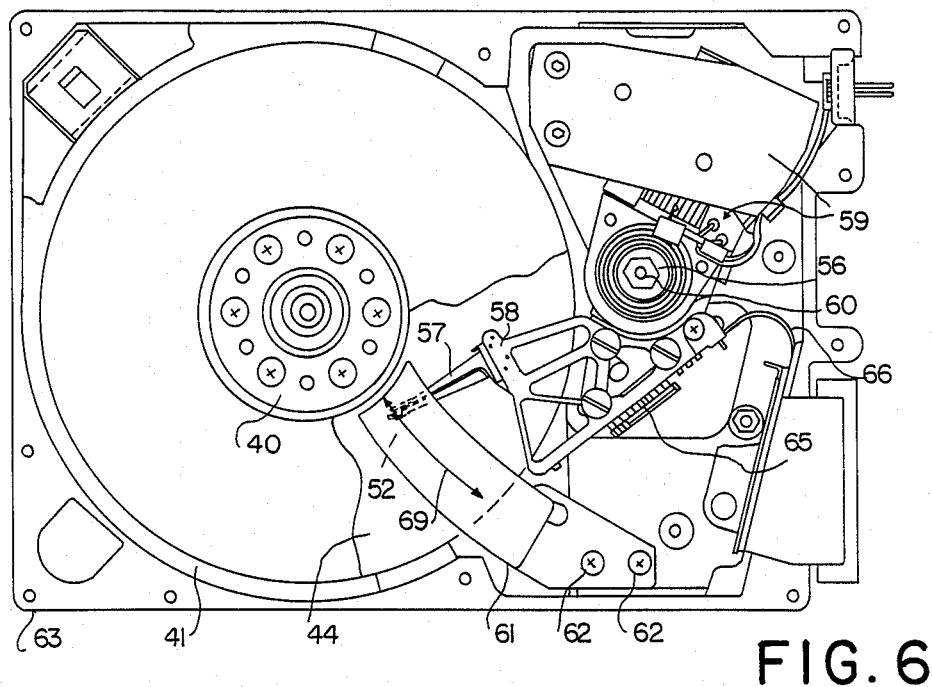
FIG. 6 is a plan view of a magnetic disk storage device according to a first embodiment of the present invention.
Figure 7:
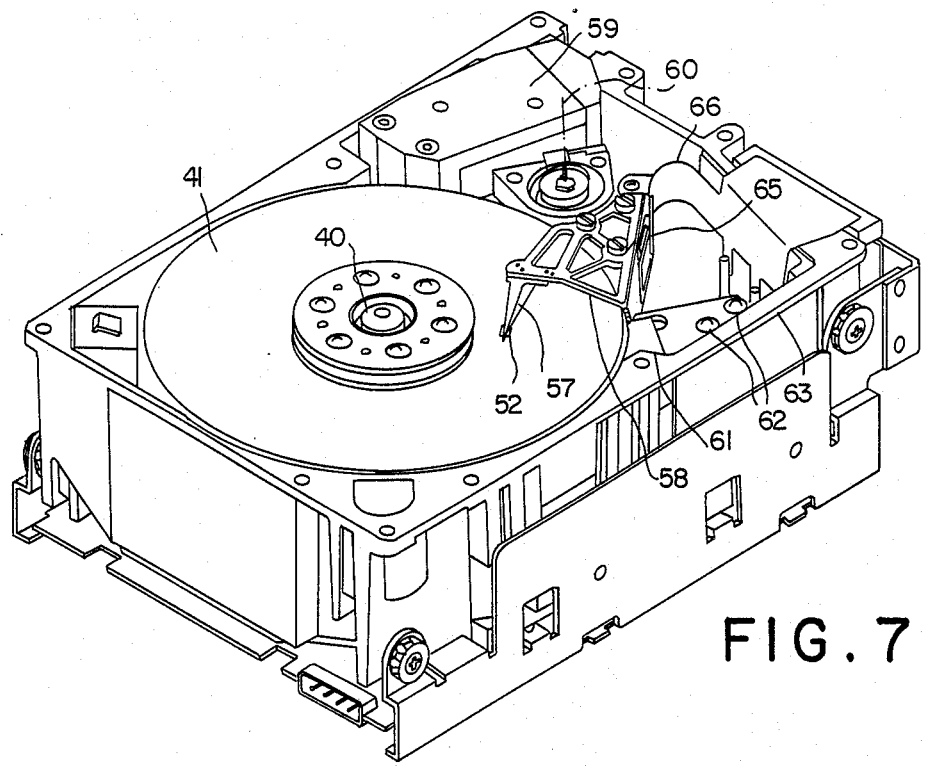
FIG. 7 is a perspective view of the FIG. 6 embodiment.
Figure 8:
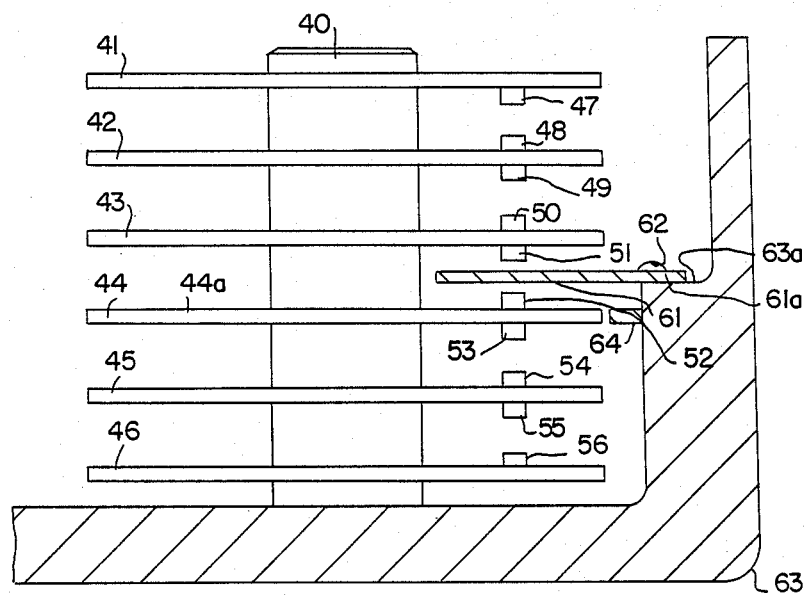
FIG. 8 is a schematic, partial cross-sectional side view of the first embodiment illustrating the arrangement of the disk assembly, magnetic heads and a shield plate.

FIG. 6 and FIG. 7 are respectively a plan view and a perspective view of the first embodiment of the present invention. FIG. 8 is a schematic cross-sectional view of the FIG. 6 embodiment. FIG. 6 is partially broken to show a shield plate 61 used to shield a servo-head 52. As shown in FIG. 8, six disks 41 to 46 are stacked co-axially around a rotatable spindle 40. Magnetic heads 47 to 53 are respectively mounted on the tips of suspension members 57 (FIGS. 6, 7) which in turn are fixed on corresponding supporting arms 58 at an end opposite to the end holding the head.

An integrated circuit semiconductor device (IC) 65 and flexible printed circuit 66 are mounted on a side surface of a head block, and receive and send signals between the magnetic heads (47–56) and a central computer (not shown). The wires connecting the magnetic heads to the IC devices must be as short as possible. This requirement gives rise to the complicated shape of the supporting arm 58.

As clearly seen from FIG. 6 and FIG. 7, the suspension member 57 is a 'straight type' member similar to that shown in FIG. 4. FIG. 8 shows that all of the heads are located in the same cylinder. In addition, a motor (not shown) drives the spindle 40 to so as to rotate the disks at a fixed speed. The supporting arms 58 are stacked together around a rotatable support spindle 56 and form a head block or head assembly. The head block is driven by a voice coil motor 59 attached to the head block. Only the head 52 is a servo-head, the other heads are data-heads. The top and bottom surfaces of disks 42 to 45, the bottom surface of disk 41, and the top surface of disk 46 are used as data regions, except for a part of the upper surface 44a of the disk 44 which is used as a servo region. Servo information is stored in the servo region. The various heads each face a corresponding surface of an opposing disk, and perform read/write operations or a servo operation while the disk assembly is rotated. Rotating disk assembly causes the heads to float or fly a predetermined height above the corresponding disk surface.

As shown in FIG. 8, the servo-head 52 is adjacent to and extremely near the data-head 51. The servo-head 52 is therefore subject to noise generated by the data-head 51 during write operations. A shield plate 61 comprising a magnetic material, such as ferrite, Permalloy (iron-nickel alloy) or a magnetic stainless steel, is interposed between the servo-head 52 and the data-head 51 to cut the path of magnetic leakage flux emanating from the data-head 51 during write operations. This reduces the undesirable effects of the noise generated by data-head 51. The shield plate 61 is attached via screws 62 at an end portion 61a to a stepped portion 63a. The portion 63a is formed on an inner surface of a side wall of a base housing 63. An opposite end 61b of the shield plate 61 extends to the spindle 40.

As an example, relevant characteristics of the various structural members are provided below. The disk has a diameter of 5 inches and comprises an aluminum substrate having a thickness of 1.27 mm. The distance between disk 43 and 44 is 6 mm, and the distance between other disks is 4.5 mm. The shield plate 61 has a thickness of 1.0 mm, and a width of 20 mm. Two side edges of the shield plate 61 are shaped in arcs about the center 60, and have radii equal to the distances between the center 60 and the respective side edge.

As noted above, the first embodiment is a 'straight type.' The servo-head 52 moves along a center line of the shield plate 61 as the swinging head positioner swings about the axis 60 of its spindle. The width of the shield plate 61 is sufficient to cover and shield the servo-head 52.

A shielding plate 64 provides additional shielding. The plate 64 has a concave arc shaped edge facing the edge of the disk 44. The plate 64 is positioned a short distance from disk 44 in a plane including disk 44. The plate 64 is secured to the inner surface of the side wall of the base portion 63. The shield plate 64 shields the servo-head 52 from the noise generated by the data-heads 53 and 54 when these magnetic heads access tracks near the peripheral edges of the disks 44 and 45. The material and the thickness of the shield plate 64 is the same as that of the shield plate 61.

Figure 9:
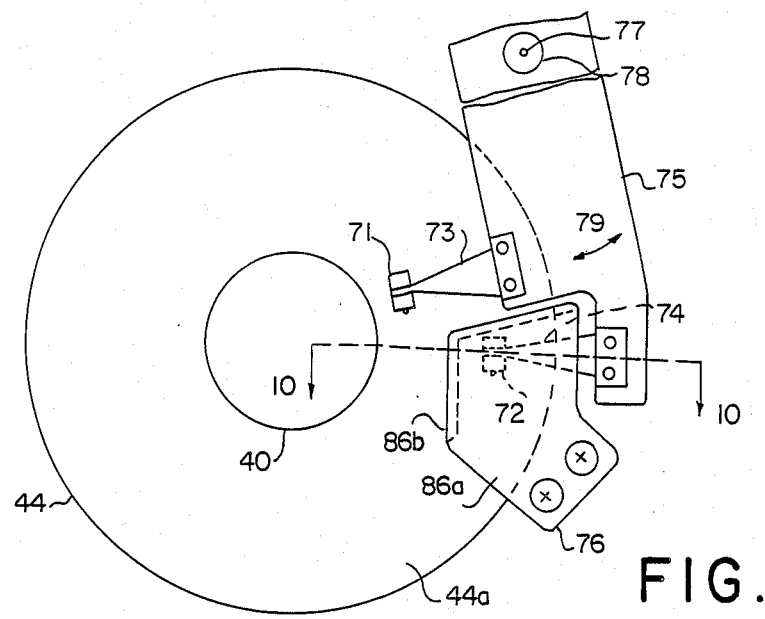
FIG. 9 is a schematic plan view of a second embodiment of the present invention illustrating the arrangement of a disk assembly, magnetic heads and a shield plate.
Figure 12:
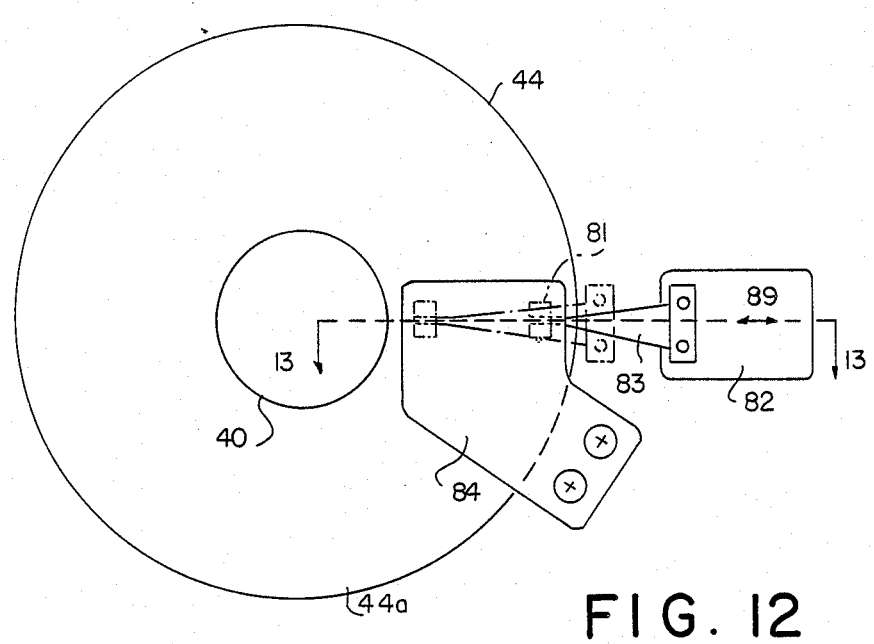
FIG. 12 is a schematic plan view of a third embodiment illustrating the arrangement of a disk assembly, magnetic heads and a shield plate.

The above-described structure of the shield plate 61 can also be used with a magnetic disk storage device having a swinging head positioner including 'dog-leg' type suspension members, and a device having a linear head positioner. The former is discussed as a second embodiment and the latter is discussed as a third embodiment of the present invention. Plan views of the second embodiment and the third embodiment are schematically illustrated in FIG. 9 and FIG. 12, respectively. In the figures, the disk assembly is assumed to be the same as that of the first embodiment.

In the second embodiment shown in FIG. 9, a supporting arm 75 rotates about an axis 77 of a spindle 78 as indicated by an arrow 79. Inner-heads 71 and 71a are arranged to face corresponding disk surfaces of disks 44 and 43. Outer-heads 72 and 72a are arranged in a similar manner. Consequently, there are four heads in the space between disks 43 and 44. The heads 71, 71a, 72, 72a are respectively fixed on the tips of suspension members 73, 73a, 74 and 74a. Only magnetic head 72 acts as a servo-head; the other heads are data-heads. The longitudinal axis of the suspension members 73, 73a, 74, and 74a are directed in radial direction of the disk assembly, and are fixed to different portions of an arm 75 as shown in FIG. 9. With this arrangement the inner-heads 71 and 71a, and the outer-heads 72 and 72a traverse different half tracks on the disk surfaces 44a and 43a. As a result, the maximum distance that a head must travel in order to access data is one half that of the first embodiment. Disk surface 44a includes a servo region in an outer half of the disk surface.

Figure 10:
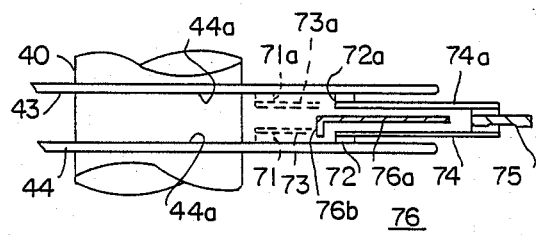
FIG. 10 is a schematic, partial cross-sectional side view of the second embodiment taken along a dotted line 10—10.

A shield plate 76 is secured to an inner wall of a housing 63 such as shown in FIG. 8 and is interposed in a space between the heads 71 and 72, and 71a and 72a as shown in FIG. 10. The shield plate 76 has a horizontal to wall 76a that lies in a plane of the supporting arm 75 and extends toward the top of FIG. 9. The shield plate 76 covers the path of the servo-head 72, and has a shallow downwardly flanged side wall 76b as shown in FIG. 10. The side wall 76b is positioned between the heads 71 and 72. With such a configuration, the servo-head 72 is effectively shielded from noise generated by the data-heads 71, 71a, and 72a, resulting in the elimination or reduction of erroneous servo operations. The material and the thickness of the shield plate 76 may be the same as that of the shield plate 61. The shape of shield plate 76 may be selected freely to achieve a good shielding effect. In addition, there is no increase in the total weight or moment of inertia about the spindle axis 77 of the moving members. Thus, the disk storage device maintains high speed operation and reliable servo operation.

By cutting the maximum distance that a head must travel in order to access data in half, the length of the suspension member is decreased. This avoids problems such as undesirable mechanical resonance oscillation that can occur with longer suspension members. In addition, the access time of the magnetic head positioner is cut by about one-half resulting in high speed operation. It is obvious that the number of magnetic heads mounted on an arm 75 in an axial direction in the above-described arrangement is not limited to two, but can be extended to three or four, for instance, as much as the design of the device allows.

Figure 11:
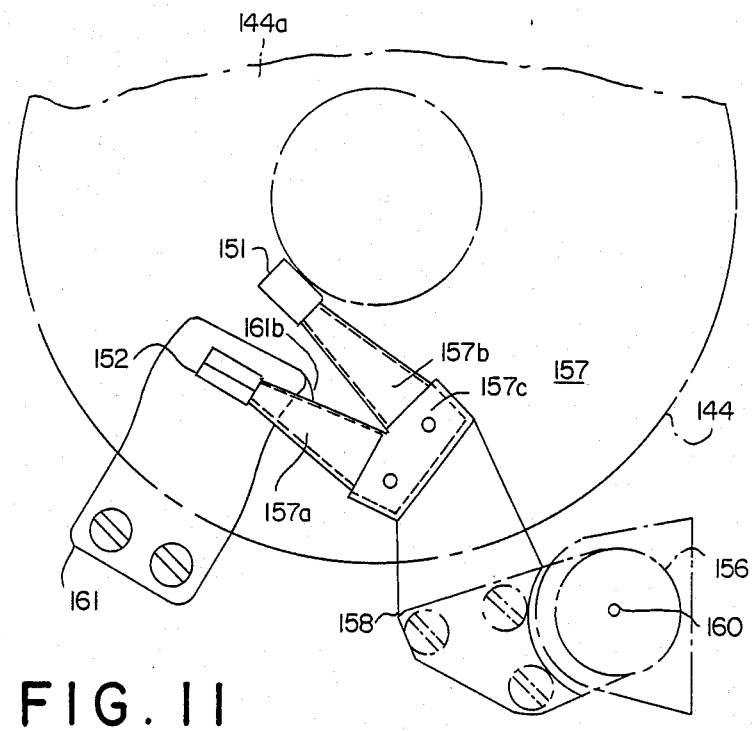
FIG. 11 is a schematic, partial plan view of a modified first embodiment illustrating the arrangement of the disk assembly, magnetic heads and a shield plate.

The structure of the supporting member for mounting two magnetic heads can be simplified. FIG. 11, illustrates an example of a simplified structure. FIG. 11 is a schematic, partial plan view of a magnetic disk storage device that is a modification of the first embodiment. In FIG. 11, a magnetic head positioner is a swinging type; that is, it swings around an axis 160 of a spindle 156. A suspension member 157 comprises gimbal springs (not shown) and spring arms 157a and 157b. The suspension member 157 is a 'straight type.' The spring arm 257 has a base portion 157c, an end of which is fixed to a rigid supporting arm 158 by welding or screws. Two branches 157a and 157b extend from the base portion 157c, and respectively mounted at tips of the branches 157a and 157b are a servo-head 152 and a data-head 151, via gimbal springs (not shown). The spring arm 157 is punched out from a thin plate made of resilient metal such as stainless steel. The servo-head 152 is positioned over an outer portion of the magnetic disk 144. Two additional data heads are mounted, on the underside of a disk stacked adjacent to and above disk 144, via another suspension member similar to the suspension member 157. With such a configuration, access time and maximum head movement is halved as in the FIGS. 9 and 10 structures.

The servo-head 152 is shielded from other three data-heads disposed in the space between the disk 144 and the disk above disk 144. A shield plate 161 is interposed between the two pairs of two magnetic heads and is secured to a stepped portion of a housing such as shown in FIG. 8. Since the servo-head 152 is disposed on the outer side, the radial length of the shield plate 161 is approximately halved in comparison with the shield plate 61 of the first embodiment. The shield plate 161 has a downwardly flanged portion 161b to shield from the noise generated by the data-head 151.

The other structural aspects of the FIG. 11 embodiment are the same as those of the first embodiment.

Figure 13:
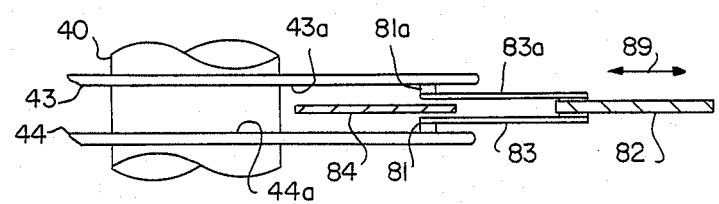
FIG. 13 is a schematic, partial cross-sectional side view of the second embodiment taken along a dotted line 13—13.

A magnetic disk storage device of the third embodiment is described with reference to FIGS. 12 and 13. The third embodiment has a linear type head positioner wherein a supporting arm 82 is transferred forward and backward along a straight line as indicated by an arrow 89. Magnetic heads 81 and 81a are positioned to oppose corresponding surfaces of disks 43 and 44. The heads 81 and 81a are respectively fixed to tips of suspension members 83 and 83a and respectively oppose surface 44a of disk 44 and surface 43a of disk 43. Only the head 81 acts as a servo-head, the other heads function as data-heads. The longitudinal axis of the suspension members 82 and 83a are directed in radial directions of the disks, and are fixed to a supporting arm 82. The supporting arm 82 and other arms are stacked with other similar supporting arms (not shown) to form a head block which is mounted to a carriage (not shown) and transferred linearly as described above. Servo regions are formed on the disk surface 44a, and data regions are formed on remaining disk surfaces.

A shield plate 84 is secured to an inner wall of a housing 63 (as shown in FIG. 8), in a space between the back surfaces of the heads 81 and 81a, without contacting two heads (as in the other embodiments). The shield plate 84 extends toward the top of FIG. 12 and covers the path of the servo-head 81. With such a configuration, the servo-head 81 is effectively shielded from noise produced by the data-head 81a, resulting in the elimination or reduction of erroneous servo operations. The material and the thickness of the shield plate 84 may be the same of that of the shield plate 61 of the first embodiment. The shape of the shield plate 84 may be selected freely to achieve a good shielding effect. In addition, there is no increase in the total weight of the linear head positioner. Thus, the disk storage device of the third embodiment maintains high speed operation and reliable servo operation. Employing the present invention with a conventional linear head positioner, may require that the length of the longitudinal suspension member be increased.

We claim:

1. A magnetic disk storage device comprising:
 a housing means having a base portion for housing said magnetic disk storage device;
 a plurality of magnetic disks being co-axially stacked and spaced apart from each other, and rotatable around an axis of rotation, said plurality of magnetic disks including a first magnetic disk having a first surface and a second magnetic disk having a second surface such that said first surface and said second surface are spaced apart and face each other;
 a plurality of magnetic heads respectively positioned adjacent corresponding ones of said plurality of magnetic disks, said magnetic heads including magnetic data-head means, positioned to face said first surface, for generating a magnetic flux so as to write data to said first surface and for reading data from said first surface, and including magnetic servo-head means, positioned to face said second surface, for reading servo information stored on said second surface; and
 shield means, positioned between said magnetic data-head means and said magnetic servo-head means and being secured to said base portion of said housing means, for preventing erroneous operation of said servo-head means by electromagnetically shielding said servo-head from the magnetic flux emanating from said data-head and for inhibiting the magnetic flux emanating from said data-head from reaching said servo-head.

2. A magnetic disk storage device according to claim 1, wherein shield means is constructed of a material selected from a group consisting of ferrite, an iron-nickel alloy, and magnetic stainless steel.

3. A magnetic disk storage device according to claim 1, further comprising magnetic head positioner means for positioning said magnetic data-head means and said magnetic servo-head means with respect to said first and second disk surfaces.

4. A magnetic disk storage device according to claim 3, wherein said magnetic head positioner means comprises swinging type positioner means for positioning said magnetic servo-head means and said magnetic data-head means along an arc-shaped orbit.

5. A magnetic disk storage device according to claim 4, wherein said magnetic head positioner means comprises:
 a supporting member comprising a suspension member flexibly suspending said magnetic servo-head means and said magnetic data-head means at a first end of said suspension member; and
 a rigid supporting arm being fixed to a second end of said suspension member being opposite said first end, so that a longitudinal axis of said suspension member is aligned in line with a straight line running from a center of said magnetic data-head means to an axis of rotation of said magnetic head positioner means.

6. A magnetic disk storage device according to claim 3, wherein said head positioner means comprises linear type positioning means for positioning said magnetic servo-head and said magnetic data-head along a straight line.

7. A magnetic disk storage device according to claim 6, wherein said magnetic head positioner means comprises:
 a supporting member comprising a suspension member flexibly suspending said magnetic servo-head means and said magnetic data-head means at a first end of said suspension member; and
 a rigid supporting arm being fixed at a second end of said suspension member opposite said first end, so that a longitudinal axis of said suspension member is in a radial direction of said first and second magnetic disks.

8. A magnetic disk storage device according to claim 5 further comprising n magnetic data-head means respectively positioned at n different radii, wherein n denotes an integer.

9. A magnetic disk storage device according to claim 7 further comprising n magnetic data-head means respectively positioned at n different radii, wherein n denotes an integer.

10. A magnetic disk storage device according to claim 8, wherein said integer n is equal to 2.

11. A magnetic disk storage device according to claim 9, wherein said integer n is equal to 2.

12. A magnetic disk storage device according to claim 10, wherein said suspension member includes:
 a spring member having a base portion and two branches extending from said base portion, each of said branches receptively supporting one of: said n magnetic data-head means and said magnetic servo-head means, said spring member comprising a single piece of a thin resilient material.

13. A magnetic disk storage device according to claim 11, wherein said suspension member includes:
 a spring member having a base portion and two branches extending from said base portion, each of said branches respectively supporting one of: said n magnetic data-head means and said magnetic servo-head means, said spring member comprising a single piece of a thin resilient material.

14. A magnetic disk storage device according to claim 1, wherein at least two of said magnetic data-head means are respectively positioned at least two difference radii.

15. A magnetic disk storage device according to claim 14, further comprising:
 a spring member comprising a single piece of a thin resilient material and having a base portion and two branches extending from said base portion, said branches respectively supporting said at least two magnetic data-head means.

16. A magnetic disk storage device according to claim 1, further comprising:
   swing type positioner means for positioning said magnetic servo-head means and said magnetic data-head means along and arc-shaped orbit with respect to said first and second disk surfaces.

17. A magnetic disk storage device according to claim 1, further comprising:
   linear type positioning means for positioning said magnetic servo-head and said magnetic data-head along a straight line with respect to said first and second disk surfaces.

18. A magnetic disk storage device comprising:
   a housing means having a base portion for housing said magnetic disk storage device;
   a first magnetic disk and a second magnetic disk being co-axially stacked and spaced apart from each other, and rotatable around an axis of rotation, said first magnetic disk having a first surface and said second magnetic disk having a second surface such that said first surface and said second surface are spaced apart and face each other;
   at least two magnetic data-head means, positioned to face said first surface and respectively positioned at different radii, for writing to and reading from said first surface;
   magnetic servo-head means, positioned to face said second surface, for reading servo information stored on said second surface;
   shield means, positioned between said magnetic data-head means and said magnetic servo-head means, and being secured to said base portion of said housing means, for electromagnetically shield said servo-head from magnetic flux emanating from said data-head and for inhibiting magnetic flux emanating from said data-head from reaching said servo-head;
   magnetic head positioner means for positioning said magnetic data-head means and said magnetic servo-head means with respect to said first and second disk surfaces;
   a supporting member comprising a suspension member flexibly suspending said magnetic servo-head means and said magnetic data-head means at a first end of said suspension member; and
   a rigid supporting arm being fixed to a second end of said suspension member being opposite said first end.

19. A magnetic disk storage device according to claim 18, wherein said suspension member includes:
   a spring member having a base portion and two branches extending from said base portion, each said branches respectively supporting one of: said n magnetic data-head means and said magnetic servo-head means, said spring member comprising a single piece of a thin resilient material.

* * * * *